July 23, 1968

H. D. SHRIVER 3,393,439

BUSHING ASSEMBLING APPARATUS

Filed March 31, 1965

INVENTOR.
HARRY D. SHRIVER
BY Bosworth, Sessions
Herrstrom & Knowles
ATTORNEYS.

United States Patent Office 3,393,439
Patented July 23, 1968

3,393,439
BUSHING ASSEMBLING APPARATUS
Harry D. Shriver, Clifton Forge, Va., assignor to H. O. Canfield Company, Clifton Forge, Va., a corporation of Virginia
Filed Mar. 31, 1965, Ser. No. 444,112
11 Claims. (Cl. 29—208)

ABSTRACT OF THE DISCLOSURE

This invention relates to an apparatus for automatically mounting resilient annular members on metal cores. The invention includes a punch press and an indexing table in which the punch press periodically reciprocates a rod relative to the indexing table. A pin is slidably mounted in a recess in the end of the rod and is resiliently biased towards an extended position. The rod reciprocates toward tooling at spaced intervals on the table, which tooling is arranged in alternate pairs. First alternates ones of the pairs of tooling support the resilient annular members, and second alternate tooling supports the metal cores. When the pin is moved to a position to penetrate the resilient annular member, the rod is retracted to lift the annular member. The table is rotated to position a second tooling support on which a metal core is positioned. When the rod is again reciprocated, the pin is engaged by either a portion of the tooling or the core to overcome the biasing means. A shoulder of the rod forces the resilient annular member onto the core.

---

Figure 1:
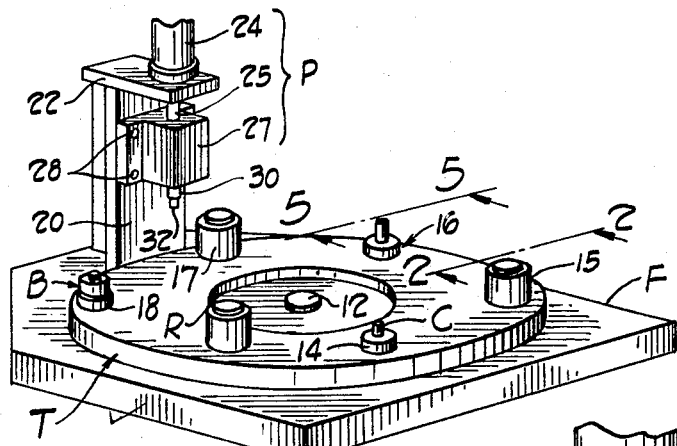

This invention relates to bushing inserting machines and methods, and more particularly, to a method and apparatus for automatically mounting metal bushings in a continuous succession of molded non-metallic articles.

Bushing inserting machines and methods are well known in the art. For example, Broden Patent 2,604,692 issued July 29, 1952, discloses a bushing inserting machine for inserting a rigid core in a resilient cylindrical member. In this particular instance, the core is entirely cylindrical. It is also known in the art to produce bushings of this general type in which the rigid core has a flanged portion on at least one end. Bushings of this type are disclosed in Lanthom Patent 2,621,948.

In the prior art devices, two piston rods are usually employed for the purpose of moving the core into the rubber ring and for producing the necessary cooperation with the core pilot on the end of the core carrying piston rod. The first piston rod usually carries the core and the pilot as it enters the resilient ring and the second piston receives the pilot and returns it to the first piston after the assembled bushing has been released by the first piston.

It is an object of this invention to provide an improved bushing inserting machine which is cheaper in construction, easier to convert for different runs and reduces the labor of operation and conversion as compared to the prior art devices.

Briefly. in accordance with aspects of this invention, a reciprocating piston rod of a punch press is provided with a sleeve or assembly tube and a pin slidably mounted in the sleeve and spring biased in its terminal extended position. The resilient sleeves and cores are moved transversely relative to the reciprocating piston in spaced, alternate toolings or stations. Advantageously, first alternate ones of these stations receive the resilient sleeves and the second alternate stations receive the metallic cores, or inner sleeve. The tooling comprising the stations for receiving the resilient sleeve or ring are cylindrical and have a first cylindrical recess slightly greater in diameter than the resilient sleeve and a second cylindrical recessed portion of reduced diameter to receive a portion of the piston-rod-supported-sliding pin such that the spring biased pin will enter and slide its reduced end portion beyond the resilient sleeve. When the piston rod is retracted it carries the rubber sleeve from the tooling and during this period of sleeve transportation, the tooling is progressed a distance of one station to bring the metallic core into axial alignment with the reciprocating piston rod. The piston rod is again actuated to move the sliding pin at least to the projecting end of the inner core and continued movement of the piston rod causes either the core or a portion of the core supporting tooling to overcome the spring bias on the pin and force the sleeve to slide the resilient ring off of the pin and over the core. The piston rod is now retracted leaving the assembled bushing at the core holder station. The stations are now progressed a distance of one station such that the assembled bushing is carried from the path of the piston rod and may be mechanically or manually removed.

In one illustrative embodiment, the spring biased pin is provided with a frusto-conical point which terminates in a circular shoulder, which shoulder has an outer diameter substantially equal to the outer diameter of the core. Preferably, the radial dimension of the shoulder is at least equal to the thickness of the core. Thus, the tapered frusto-conical portion constitutes an alignment device or guide point for aligning the reciprocating pin with the core axis and the sleeve slides the resilient ring from the reciprocating, spring-biased pin over the core with a minimum of resistance. Advantageously, the tooling which receives the rubber ring has a cylindrical portion in which air is entrapped by the combination of the spring-biased pin which fills the center of the resilient ring and compresses the air as it moves through the ring. This entrapped air escapes between the rubber ring and the pin as the pin is moved into engagement with the ring, which air movement forces the resilient ring to expand and reduces the frictional engagement between the ring and the pin.

In accordance with other aspects of this invention, the cylindrical pickup pin is provided with a reduce cylindrical termination which termination is connected to the main cylindrical body by means of an intermediate frusto-conical section. Before picking up the resilient sleeve, the pin is pushed into the sleeve and this is facilitated by the reduced cylindrical terminal portion and the tapered intermediate frusto-conical portion. This movement is also facilitated by the escape of compressed air between the pin and the sleeve which air was compressed by the pin moving into the sleeve. When the station supporting the metal core is positioned in axially aligned relation to the reciprocating assembly tube, the piston is operated and the reduced cylindrical point of the sliding pin is brought into contact with a core aligning pin in the core supporting tool, which engagement of pins forces the sliding pin to compress the biasing spring. The assembly tube pushes the resilient sleeve off of the pin and onto the metallic core. Thus, it is not essential that the sliding pin engage the core. Preferably, however, the central cylindrical pin portion, which carries the sleeve, is juxtaposed the core to permit the slightly stretched sleeve to slide from the former onto the latter.

Other objects and advantages relate to certain novel features of construction and combinations and arrangements of parts which provide economy in manufacture and operation. The invention is described in connection with the accompanying drawings forming a part of the specification and illustrating preferred embodiments which represent the best known modes of practicing the invention.

Figure 14:
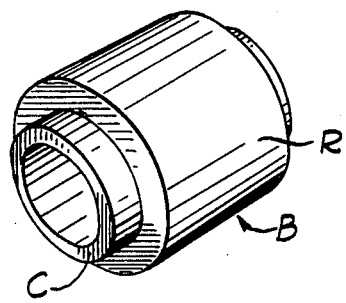
Figure 15:
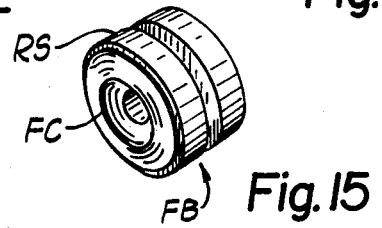

FIG. 1 is a view in perspective of an index table and a portion of a punched press defining portion of these illustrative embodiments of the invention;

FIGS. 2 thru 7 are fragmentary views to an enlarged scale showing the cooperation of the apparatus of FIG. 1 through a normal sequence of operation in assembling bushings of the type shown in perspective in FIG. 14;

FIGS. 8 thru 13 are fragmentary views of a sequence of operation of the apparatus of FIG. 1 with a modified set of tooling for the purpose of producing bushings with a flanged core of the type shown in perspective in FIG. 15.

Referring now to the drawing, FIG. 1 is a perspective view of portions of one illustrative embodiment of this invention in which a frame F, only a portion of which is shown, supports a punch press P adjacent an indexing table T. The table T is rotatably mounted on the frame F by means of a suitable pin 12 which cooperates with suitable bearings, not shown. A series of alternate toolings, or stations 13, 14, 15, 16, 17 and 18 are mounted in a circle on the surface of the table T and are sequentially positioned beneath the punch press P. The indexing table T between successive toolings, as well as the synchronization of this movement, with the movement of the punch press P, is accomplished by a driving and control mechanism of the type well known in the art. Accordingly, this portion of the apparatus will not be shown or described in detail. A beam 20 extends vertically from the frame F and supports a platform 22 extending parallel to the table T. The platform 22 and beam 20 support the punch press including a suitable cylinder 24 which contains a piston, not shown, from which extends a piston rod 25. Actuation of the piston by means of pneumatic or hydraulic force of the type well known in the art, reciprocates the rod 25 in a suitable block 27 secured to the face of the beam 20 by means of fasteners, such as the screws 28. Threadably, or otherwise, secured to the end of the piston rod 25, is a suitable assembly tube or sleeve 30 which supports in slidable relationship, a pin 32. The apparatus of FIG. 1 is shown equipped for tooling to assemble bushings of the type shown in FIG. 14 in which a bushing B includes a cylindrical metal core C having an encircling resilient ring R. For the purpose of this explanation, it is assumed that the table T is being rotated in the counterclockwise direction as in FIG. 1 and that the bushing B in the tooling 18 has just been assembled by picking up a resilient sleeve from tooling 13 and mounting it on a core at tooling 18.

The tooling 13 thru 18 on the table T comprises three pairs of alternate type of tooling. Each pair constituting the tooling required for the assembly of a single bushing B. Subsequent to the assembly of the bushing B in tooling 18, the bushing is removed and a core C is inserted in tooling 18 with one end of the core C projecting vertically and a resilient sleeve R is positioned in the tooling 13, also with its axis extending vertically. As the table rotates in stepwise fashion in a counterclockwise direction, the tooling 17 will be positioned beneath the reciprocating pin 32 and the cylinder 24 will be supplied with a fluid from a suitable hydraulic or pneumatic source, not shown, to activate the piston and move piston rod 25 downwardly.

Figure 2:
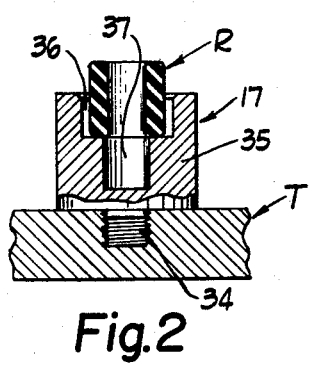

FIG. 2 is a fragmentary enlarged view of a portion of the tooling shown in FIG. 1 with the assembly tube 30 in its lower terminal position. The tooling 17 is shown in section and has a main cylindrical body 35 and is joined to the table T by a threaded engagement along a cylindrical extension 34. The main cylindrical body 35 has a first relatively large cylindrical recess for receiving the rubber sleeve R and a second communicating reduced cylindrical recess 37 which is axially aligned with the cylindrical recess 36 for the purpose of receiving the end of the pin 32 in a manner which will be subsequently described.

Figure 3:
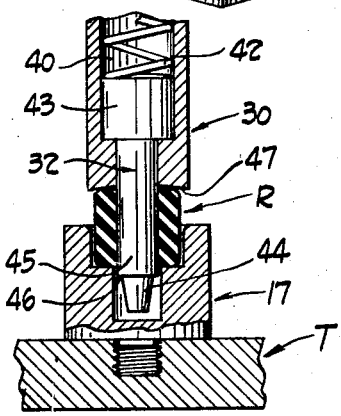

FIG. 3 is a fragmentary view similar to FIG. 2 except that it shows the tooling 17 positioned beneath the punch press P of FIG. 1 and with the punch press P actuated to move the pickup pin 32 into engagement with the resilient sleeve R. The pickup pin 32 is slidably mounted in a suitable cylindrical bore 40 of the assembly tube or sleeve 30 and is spring-biased into its terminal extended position by means of a suitable helical spring 42, only a portion of which is shown. The opposite end of the spring 42 abuts against the end of rod 25. The spring 42 engages an enlarged cylindrical portion 43 of the sliding pin 32. The opposite end of the sliding pin 32 from portion 43 includes a frusto-conical point 44 which terminates in the central cylindrical portion 45 to define an annular shoulder 46 therewith. Annular shoulder 46 has a particular function which will be subsequently described in detail. Prior to the positioning of the resilient sleeve R in the nest 17, the sleeve R is provided with a suitable lubricant to reduce the friction between the rubber sleeve R and the pickup pin 32. When the pickup pin 32 enters the rubber ring R, the rubber ring R expands and seals the reduced cylindrical recess 37. The movement of the pin 32 compresses the air between the end of the pin 32 and the cylindrical recess. The only path for exit of this air is between the rubber sleeve R and the central cylindrical portion 45 of the pin 32. As the compression of this air continues, air begins to escape between the rubber ring R and the central cylindrical portion 45 thus reducing the frictional engagement between the rubber sleeve R and the central cylindrical portion 45. The assembly tube 30 includes an annular shoulder 47 which engages and compresses sleeve R to slow the downward stroke of tube 30.

Figure 4:
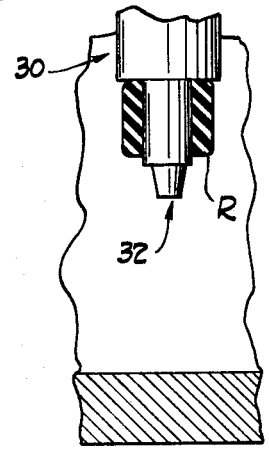
Figure 5:
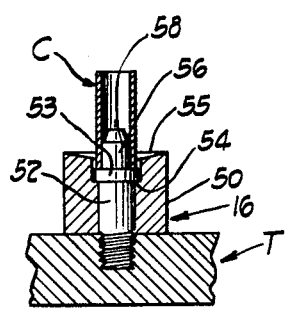

FIG. 4 is a fragmentary view of the lower end of the reciprocating sleeve 30 and pickup pin 32 showing the pickup pin lifting the ring R above the table T and showing the table rotating between the tooling positions as indicated by the arrow beneath the table. FIG. 5 is a fragmentary view of the table T showing the details of the tooling 16 and a metal core C supported thereby which tooling is identical to the toolings 14 and 18. The tooling 16 includes an outer cylindrical resilient sleeve stop member 50 which receives a centrally positioned core holder pin 52. Pin 52 has a shoulder 53 which engages a shoulder 54 on the metal holder 50, which pin threadably engages the table T to secure the pin and stop member 50 in position. The pin 52 includes a reduced cylindrical portion and a frusto-conical point 58. With this arrangement, the core C can be positioned on the reduced cylindrical portion 56 with one circular surface abutting the shoulder 53.

Figure 6:
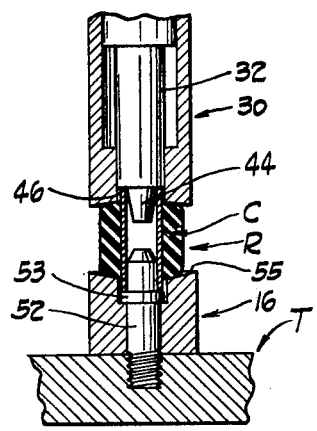

FIG. 6 is a fragmentary view of a portion of the table T showing the tooling 16 in axial alignment with the reciprocating sleeve or assembly tube 30 and with the annular shoulder 46 of the pin 32 engaging the core C. The downward movement of the sleeve 30 has caused the core C to engage the sliding pin 32 and overcome the spring bias of the helical spring 42 shown in FIG. 3 such that the pin 32 is forced upwardly into the sleeve 30 permitting the annular shoulder 47 to push the resilient sleeve R over the core C until the sleeve R engages an annular frustoconical surface 55 of the cylindrical stop 50.

Figure 7:
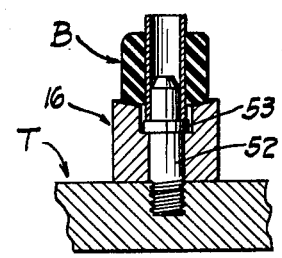

FIG. 7 is a fragmentary view of the tooling 16 as it supports the assembled bushing B after the reciprocating sleeve 30 has been retracted. The assembled bushing B may now be removed from the tooling 16 either manually or by suitable mechanical means, such as a reciprocating plunger which strikes the side of the bushing B or by any other convenient means well known in the art.

Because of the simplicity of this tooling and apparatus, it is possible to quickly and easily convert the apparatus for the assembly of different types of bushings. For example, toolings 13, 14, 15, 16, 17 and 18 may be removed from the table T and different toolings substituted therefor. Similarly, the reciprocating sleeve, or assembly tube, 30 may be removed from the end of the piston rod 25 and a separate assembly tube substituted therefor.

Figure 8:
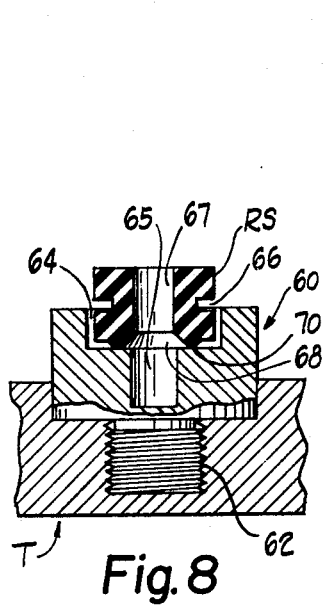

FIGS. 8 thru 13 show various fragmentary views of a sequence of assembly of the apparatsu of FIG. 1 employing a substituted set of tooling for the purpose of assembling a flanged bushing FB shown in perspective in FIG. 15 as including a rubber sleeve RS and a flanged core FC. FIG. 8 is a fragmentary view of a modified metal resilient nest 60 secured to the table T by threaded engagement as indicated at 62. The resilient sleeve nest 60 is similar to the nest 17 shown in FIG. 2 in that it includes a first cylindrical recess 64 and a second reduced cylindrical recess 65 axially aligned with the recess 64. The resilient sleeve RS, which forms a part of the flanged bushing FB, has an annular, circumferential recess 66, a central cylindrical passage 67, a frusto-conical surface 68 communicating with the central cylindrical passage 67 which frusto-conical surface terminates in a ridge 70. The adjoining surface of the ridge 70 is concave in cross-section and includes an annular concave surface 72.

Figure 9:
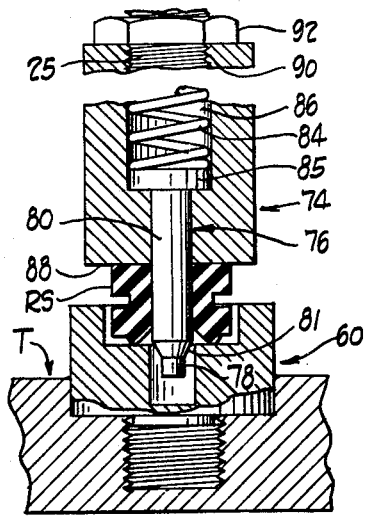

FIG. 9 is a fragmentary view showing a modified assembly tube 74 axially aligned with the tooling 60 and with a pickup pin 76 positioned at its terminal position of travel within the resilient sleeve RS. Ths particular pickup pin has a reduced cylindrical terminal portion 78 which is connected to an intermediate cylindrical portion 80 by means of a frusto-conical surface 81. Pickup pin 76 is spring-biased by a suitable helical spring 84 which engages an enlarged cylindrical portion 85 of the pickup pin 76 to maintain pin 76 in its terminal extended position within the bore 86 of the assembly tube 74. In the postion shown in FIG. 9, the annular cylindrical surface 88 of the assembly tube 74 is in engagement with the upper surface of the rubber sleeve RS. In reaching the position shown in FIG. 9, the pickup pin 76 compresses the air within the cylindrical bore 67 of the rubber sleeve RS and within the cylindrical recess 65 and this air escapes between the central cylindrical portion 80 of the pickup pin 76 and the cylindrical bore 67 of the rubber sleeve RS to thus reduce the friction during this movement of the pickup pin 76. This friction is also reduced by the use of a suitable lubricant on the rubber sleeve RS. The upper portion of FIG. 9 shows the end of the piston rod 25 threadably engaging the assembly tube 74 at 90 and also shows a locking nut 92 for locking the assembly tube 74 against rotation relative to the piston rod 25. This arrangement also permits adjustment of the length of the stroke of the pickup pin 76 relaitve to the tooling 60 to assure engagement of terminal portion 78 with a portion of the core supporting tooling, as will be subsequently described.

Figure 10:
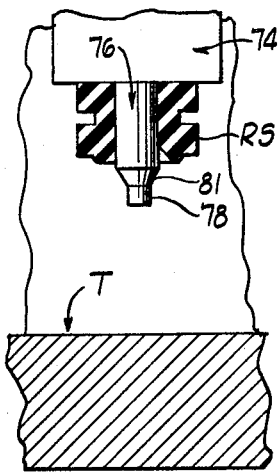

FIG. 10 is a fragmentary view showing the table T being rotated relative to the punch press P, as indicated by the arrow beneath the table T, and showing the assembly tube 74 in a retracted position with the pickup pin 76 supporting the rubber sleeve RS.

Figure 11:
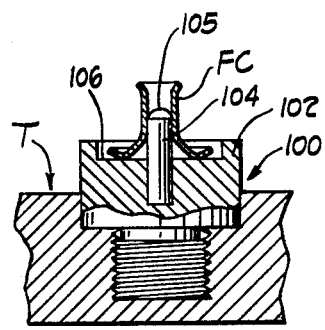

FIG. 11 is a fragmentary view showing a core supporting tooling 100 which includes a cylindrical body 102 having an axially aligned pin 104 projecting from a recess therein and having a recessed annular circular surface 106 such that the combination of pin 104 and surface 106 receive the flanged core FC which is to be assembled into the bushing and maintain this core axially aligned with body 102 and pin 104. The pin 104 includes a rounded point 105 which limits the downward movement of the pickup pin 76 in a manner which will be subsequently described and the pin 104 and its point 105 overcome the bias of spring 84 and force the pin 76 into assembly tube 74 in a manner which will be described in conjunction with FIG. 12.

Figure 12:
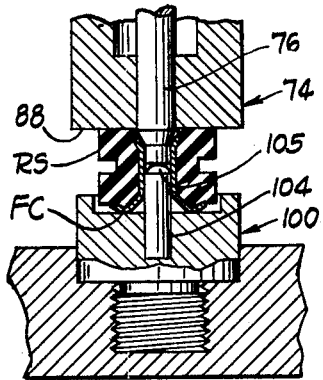

The apparatus shown in FIG. 12 includes the table T indexed into a position into which the tooling 100 is axially aligned with the assembly tube 74 and with tube 74 in its terminal advanced position. The point 105 of pin 104 has engaged the reduced cylindrical tip 78 of pin 76 and has pushed the pin 76 with sufficient force to overcome the spring bias of spring 84 thus causing the annular surface 88 of the assembly tube 74 to push the rubber sleeve RS over the flanged core FC.

Figure 13:
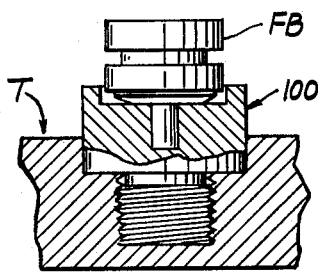

FIG. 13 is a view of the tooling 100 after the assembly tube 74 has retracted leaving the assembled flanged bushing FB on the cylindrical tooling member 102 from which it may be readily removed either manually or mechanically in any manner well known in the art.

From the foregoing description, it is apparent that this apparatus is simple and economical in construction, that it can be quickly and easily converted from one type of bushing assembly to another. Further, the tooling is relatively economical because of its simplicity. Still further, this apparatus can be constructed from currently manufactured assemblies. It is also apparent that this is a simple and easy method of bushing assembly.

In accordance with the patent statutes, the principles of the present invention may be utilized in various ways, numerous modifications and alterations being contemplated, substitution in parts and changes in construction being resorted to as desired. It is understood that the embodiments shown in the drawing and described above are merely for purposes of explanation and illustration without intention to limit the scope of the claims to the specific details disclosed.

What is claimed is:

1. An apparatus for assembling a resilient member having a circular passage therethrough onto a cylindrical core, comprising:

a reciprocating sleeve;
 a pin slidably mounted in said sleeve;
 biasing means normally biasing said pin in a terminal extended position;
 nest means for supporting said resilient member and having a circular recess to be aligned with said circular passage;
 core supporting means for supporting a core with one end of the core projecting therefrom;
 means for axially aligning said pin and said nest means and reciprocating said pin to project said pin into said resilient member, stretching said resilient member onto said pin and compressing air in said recess and for retracting said resilient member from said nest means with said pin; and
 means for reciprocating said sleeve in axial alignment with said core including means for positioning said pin in contact with the projecting end of said core and further moving said sleeve to push said resilient member from said pin onto the projecting end of said core.

2. An apparatus for assembling a plurality of bushings each including a resilient sleeve mounted on a cylindrical core, comprising:

a frame;
 punch press means mounted on said frame and including,
  a reciprocating assembly member having a cylindrical recess in the end thereof;
  pin means slidably mounted in said recess between terminal extended and terminal retracted positions for picking up and carrying a resilient sleeve;
  biasing means in said recess normally maintaining said pin means in its terminal extended position;
 indexing means including a plurality of alternate stations, first alternate ones of said stations having shoulders for supporting a rubber sleeve in alignment with a recess and second ones of said alternate stations having means for supporting a core with one end of the core projecting whereby said bushings are assembled by sequentially positioning said stations in axial alignment with said reciprocating assembly member relative to said first alternate stations, reciprocating said assembly member thereby causing said pin means to engage and carry a resilient sleeve and reciprocating said assembly member relative to said second alternate stations to bring said pin means into engagement with a projecting end of a core and continuing to move said member to compress said biasing means and cause said assembly member to push said sleeve from said pin means onto said core.

3. An apparatus for assembling bushings, each having a resilient sleeve on a cylindrical metallic core, including:
 a frame;
 punch press means mounted on said frame and including,
  an assembly rod mounted for reciprocation relative to said frame and having a cylindrical recess in one end thereof,
  pin means slidably mounted in said recess and including a portion having a diameter greater than the internal diameter of said sleeve for picking up and carrying said sleeve,
  biasing means including a spring normally maintaining said pin means in its terminal extended position; and
 indexing means including a table rotably mounted on said frame in the path of said reciprocating assembly tube and having a plurality of alternate stations, first alternate stations each including tooling for supporting a resilient sleeve and second alternate stations each including tooling for supporting a core with one end of the core positioned for axial alignment with said rod by rotation of said table.

4. The combination according to claim 3 wherein said pin has a shoulder thereon for engaging the projecting end of said core whereby said core overcomes said biasing means and pushes said pin into said recess.

5. The combination according to claim 3 wherein each of said second alternate stations includes a pin for projecting into said core and engaging said slidably mounted pin for overcoming the bias of said biasing means and forcing said slidably mounted pin into said assembly rod whereby said rod pushes said sleeve onto said core.

6. The combination according to claim 3 wherein each of said second alternate stations includes a stop for limiting the travel of said resilient sleeve and wherein said core aligning pin has a shoulder thereon for supporting said core.

7. The combination according to claim 3 wherein said slidably mounted pin means has a reduced portion defining a terminal end, which terminal end engages a portion of said second alternate station tooling to overcome the bias of said biasing means and force said pin means into said recess, whereby said assembly rod pushes said resilient sleeve onto said core.

8. An apparatus for assembling a resilient sleeve having a cylindrical passage therethrough on a rigid cylindrical core, comprising:
 a frame;
 punch press means including,
  a reciprocating assembly rod reciprocably mounted relative to said frame and having a recess including a pin stop shoulder adjacent one end thereof,
  a pin slidably mounted in said recess, and
  spring biasing means normally biasing said pin in a terminal extended position against said shoulders; and
 indexing means including a movable platform movable in a path transverse the path of reciprocation of said rod, said platform having at least a first and second station thereon, said first station including resilient sleeve supporting tooling for supporting a resilient sleeve in axial alignment with said pin to be picked up and carried thereby, and second station including tooling for supporting a core with one end of the core projecting normally from said platform whereby reciprocation of said rod between the indexing of said tube causes said pin to enter said sleeve, transport said sleeve to the projecting end of the core and subsequent movement of said rod forces said pin into said recess and said rod moves said sleeve onto said core.

9. The apparatus according to claim 8 wherein said pin has a first cylindrical portion in sliding engagement with said rod, a second cylindrical portion connected to said first portion and having a diameter greater than the diameter of said shoulder and a terminal portion of smaller cross-section than said second portion for expanding said sleeve as said pin enters said cylindrical passage.

10. The apparatus according to claim 9 wherein said terminal portion is conical and has a diameter adjacent said second portion less than the diameter of said second portion such that a core end-engaging shoulder is provided and wherein the diameter of said second portion is substantially equal to the outer diameter of said core.

11. The apparatus according to claim 9 wherein said second station tooling includes a core supporting pin whereby said terminal portion of said supporting pin engages said sliding pin to overcome said bias when said tube is advanced toward said second station tooling thereby preventing said pin from applying a compressive stress to said core.

References Cited

UNITED STATES PATENTS

| | | | |
|---|---|---|---|
| 1,778,399 | 10/1930 | Phelps | 29—450 UX |
| 2,261,465 | 11/1941 | Grange et al. | 29—450 UX |
| 2,632,236 | 3/1953 | Dodge | 29—450 UX |
| 2,839,821 | 6/1958 | Johnson et al. | 29—451 UX |
| 2,987,812 | 6/1961 | Donaldson et al. | 29—208 X |
| 2,992,476 | 7/1961 | Dutton et al. | 29—451 |
| 3,238,609 | 3/1966 | Nichols | 29—450 UX |

CHARLIE T. MOON, Primary Examiner.